June 26, 1962 W. A. HEARTHER 3,040,644

PHOTOGRAVURE DEVICE

Filed June 10, 1958 2 Sheets-Sheet 1

INVENTOR.
WESTON A. HEARTHER
BY Henry N. Young
ATTORNEY

INVENTOR.
WESTON A. HEARTHER
BY Henry N. Young
ATTORNEY

United States Patent Office 3,040,644

Patented June 26, 1962

3,040,644

PHOTOGRAVURE DEVICE

Weston A. Hearther, 2363 108th Ave., Oakland 5, Calif.

Filed June 10, 1958, Ser. No. 741,157

4 Claims. (Cl. 95—64)

The invention relates to the provision of positives or negatives for use in producing photogravure printing plates, and particularly in the production of sets of plates arranged for successive associated use, as in providing multi-colored printed matter.

Understanding that the multi-color photogravure printing process generally involves the successive application of a plurality of inked photogravure or intaglio plates for depositing inks of different colors on the same receiving surface with precise corresponding registration for providing multi-colored printing, the present device concerns the production of cooperative sets of complementary photogravure or intaglio plates by the use of a camera assembly which does not require rotative adjustments of the subject-matter, or copy, to be reproduced. More specificaly, the production of sets of cooperative photogravure printing plates is essentially effected by the interposition between a rotatively adjustable half-tone screen and the fixedly mounted matter to be photographed on a plate or film carrying a photo sensitive contrast emulsion for providing reducible dots, of a stop member providing a more-or-less cruciform diaphragm opening and mounted for rotative adjustments about its axis in the production of cooperative printing plates of a set thereof, whereby the lines of ink-receiving depressions provided in the different printing plates may be differently related in the etched faces of the said plates to prevent screen pattern effects without involving a rotation, with its possible mislocation, of the original copy or photographed material.

In view of the foregoing, a general object of the invention is to provide an improved method and means for producing a color-printing set of cooperative photogravure printing plates.

Another object is to provide an improved manner and means of utilizing a camera stop in the production of a set of cooperative photogravure printing plates.

A further object is to provide a means for mounting a stop of the character described for its measured rotative adjustments to indicated degrees with reference to a fixed reference position.

An added object is to provide and utilize stops having diaphragm openings which are particularly effective for producing sets of cooperative photogravure printing plates in accordance with the present method and means.

The invention possesses other objects and features of advantage, some of which, with the foregoing, will be set forth or be apparent in the following description of a typical embodiment thereof, and in the accompanying drawings, in which, FIGURE 1 is a generally diagrammatic section showing a photographic camera assembly arranged for use in accordance with my invention.

Figure 1:
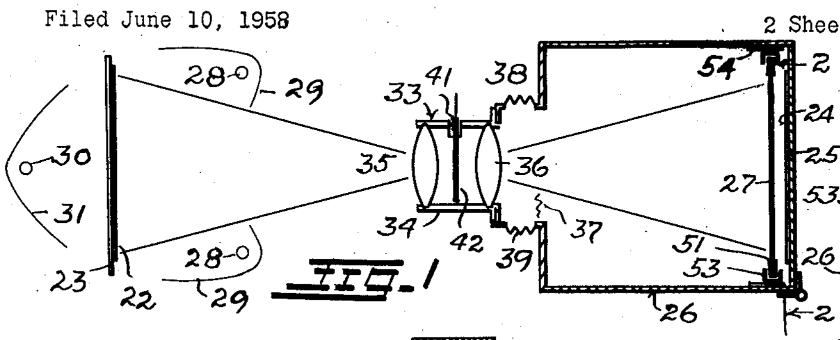
Figure 2:
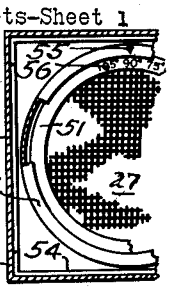
FIGURE 2 is a fragmentary sectional view taken at the line 2—2 in FIGURE 1.

Essentially, the present features of interest relate to the mounting and use of a stop member in a photographic apparatus in which a colored picture, or other object, is to be used as a subject for the provision of sets of photogravure printing plates by photographing the subject through a diaphragm opening and a screen. A camera comprising photographic apparatus for use in accordance with my invention is more-or-less diagrammatically illustrated in FIGURES 1 and 2 wherein subject matter provided by an element 22 replaceably mounted on a flat and rigid backing plate 23 is arranged to be photographed at the same, or an adjustably changed, scale on a photographically sensitive image-receiving film or plate element 24 which is replaceably mounted on an opaque backing plate 25 displaceably carried at and across the rearward end of a box or casing 26 of uniform rectangular cross-section which disposes a half-tone screen 27 of appropriate mesh in front of the mounted element 24 for its mutually independent rotative and fore-and-aft adjustments with respect to the element. As particularly indicated, the backing plate 25 is hinged to the casing 26 at its bottom and comprises the rear casing wall to thereby facilitate the mounting or removal of plate or film elements 24 with respect to it, such elements being, for descriptive convenience, hereinafter referred to as films.

When a subject element 22 is opaque, the "picture" face thereof is disposed and arranged for its illumination from lamps 28 disposed in front of it and operative to project the light therefrom against said face directly and by reflection from suitably disposed reflectors 29. If a subject element 22 is transparent, the mounting plate 23 therefor would also be transparent to provide for its illumination from the rear, as by a lamp 30 having its emitted light projected against and through the plate and element by the action of a suitable reflector 31. Since picture subject elements to be photographed with a present apparatus might be either opaque or transparent, the backing plate 23 would generally, and preferably, be transparent. Alternatively, subject elements 22 might comprise appropriately illuminated original three-dimensional objects in lieu of an element 22 and its backing plate 23.

It will now be noted that the image-forming light which is projected toward the image-receiving element 24 of the present apparatus is directed through a unitary lens-and-stop assembly 33 which is suitably mounted in front of the casing 26, and comprises a lens tube 34 carrying forward and rear lenses 35 and 36 in its opposite ends. In the present arrangement, the rearward end of the tube 34 is connected at an opening 37 in the front end 38 of the casing 26 by a continuous bellows 39, whereby to provide for longitudinal adjustments of the lens tube 34 with respect to an image-receiving element 24 carried by the rear casing end 25; with such an arrangement the relative sizes of the object and image may be adjustably varied as desired or required. Intermediately thereof, the lens tube 34 is slotted across its upper side portion in a plane perpendicular to its axis to provide for the replaceable insertion through its arcuate slot 41 of a carrier unit 42 for mounting an appropriately apertured stop plate element of circular outline providing a suitable diaphragm opening which is symmetrical to the stop center.

Figure 12:
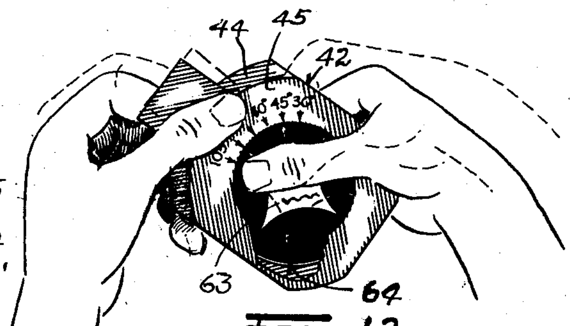
FIGURE 12 illustrates the manner of adjusting the stop of FIGURE 8 in its carrier.
Figure 13:
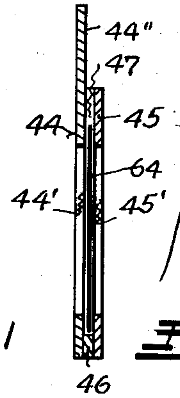
FIGURE 13 is an enlarged cross-section taken at the line 13—13 in FIGURE 8.

As is brought out in FIGURES 12 and 13, the present carrier unit 42 essentially comprises plate member 44 and 45 having opposed portions of like outline cooperative with a flat U-shaped spacing element 46 of uniform thickness fixed to and between them to provide within it, and between the members 44 and 45, a semi-cylindrical socket or pocket 47 in which a stop member of circular outline may be rotatively and gravitationally retained in coaxial relation with like aligned and somewhat smaller circular openings 44' and 45' provided in the members 44 and 45 respectively. The present stop carrier 42 is arranged to be non-rotatably mounted in the tube by reason of the fact that the carrier unit has straight and corresponding and mutually parallel outer edge portions 42' at opposite sides thereof and spaced to slidably fit between the ends of the tube slot 41, and has bottom edge portions 42'' curved as the bore of the lens tube 34 for a seating of the stop upon said bore. As particularly shown, the plate 44 of the carrier 42 is provided with a radial tab 44'' which is arranged to extend above the mounting lens tube for facilitating a mounting or dismounting of the carrier, and said tab may, as shown, be narrower than is the carrier between its side edges 42'.

Since the stop carrier 42 is non-rotatably mounted in the tube slot 41 which receives it by reason of the fact that the carrier has straight and mutually parallel edge portions 42' at the opposite sides thereof for a guided movement of the carrier between the slot ends, a means is provided for indicating different turned positions of a stop plate mounted on the carrier, said means presently comprising an arcuate angle scale 48 providing a protractor line of angle calibrations on the exterior face of the carrier element 45 and coaxial with the stop plate axis. The present calibrations of the carrier scale 48 indicate a range with 15-degree steps between 30 degrees and 105 degrees inclusive, whereby an index point 49 on a stop plate member installed in the socket 47 of the carrier member 42 may be readily referred to different positions along the line of calibrations for setting the stop member in various identifiable and rotatively adjusted positions while the mounted subject element is held fixed with respect to the lens-and-stop assembly 33, it being understood that rotary adjustments of a stop plate through angles of 90 degrees or more could only repeat the settings possible within a 90-degree range on the scale 48.

The half-tone screen 27 is a circular outline, and is fixed in an interior channel provided by an annular edge-binding frame 51 which is of uniform channel cross-section and is rotatively mounted in a continuous annular guideway provided by a channel member 53 which carries the screen 27 for rotative adjustments thereof about its center which is disposed in the photographic axis of the camera. A frame 54 fixedly carries the member 53 and is complementarily and slidably engaged within the bore of the casing 26 for its longitudinal movement therealong to provide for a fore-and-aft adjustment of the center of the screen along the photographic axis of the camera to vary the spacing of the screen from an opposed image-receiving element 24. Also, half-tone screens 27 of different mesh and of like diameter may be provided for alternative installation and use for present purposes. Rotative adjustments of the mounted screen 27 are designed to be made in accordance with rotative adjustments of a stop plate mounted in the carrier 42 and as related to the scale 48 for the stop, a pointer 55 and its protractor scale 56 being appropriately and respectively provided on the guideway member 53 and on the edge-binding frame 51 of the screen, as is disclosed in FIGURE 2.

Figure 3:
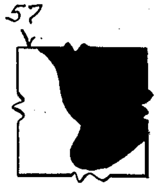
FIGURE 3 is an enlarged fragmentary face view of a portion of positive copy arranged for its use in providing a photogravure printing plate.
Figure 4:
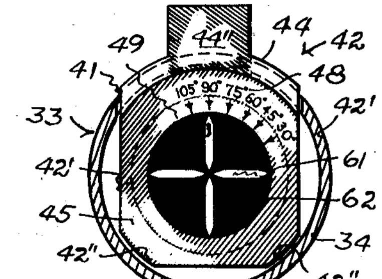
FIGURE 4 is a face view of a stop carrier mounting a stop of the device in a lens tube shown in section at the carrier.
Figure 5:
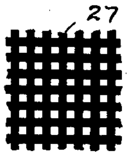
FIGURE 5 is a fragmentary view of a portion of a half-tone screen used with the camera.
Figure 6:
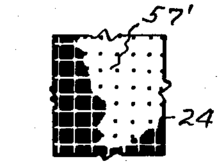
FIGURE 6 is a fragmentary view indicating the photographic condition of a film or plate on which the positive of FIGURE 3 has been photographed as a developed negative.
Figure 7:
FIGURE 7 is an enlarged fragmentary face view of a portion of a negative arranged for its use in providing a photogravure printing plate.
Figure 8:
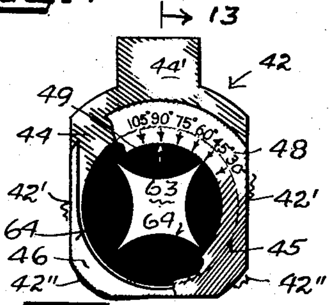
FIGURE 8 is a face view of a stop carrier mounting an alternative stop of the device, a portion of the carrier being broken away.
Figure 9:
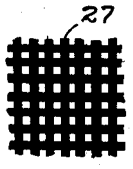
FIGURE 9 is a fragmentary view of a portion of a half-tone screen used with the camera.
Figure 10:
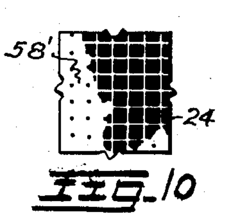
FIGURE 10 is a fragmentary view indicating the photographic condition of a film or plate on which the negative of FIGURE 7 has been photographed as a developed positive.
Figure 11:
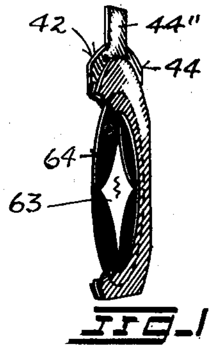
FIGURE 11 is a broken-away perspective view of the stop carrier and stop of FIGURE 8.

In providing sets of photogravure plates for color printing or other multiple-impression printing, experience has shown that the stop apertures preferably have quite different four-pointed and symmetrical cruciform outlines when they are used with photographically negative copy 57 and photographically positive copy 58, or with original copy, for providing etched photogravure plates therefrom. Thus, by reference to FIGURES 3 to 6 inclusive, it will be noted that the diaphragm opening 61 of a stop plate 62 shown as mounted in the socket 47 of the carrier 42 comprises relatively narrow zones of like and general spindle outline radiating from the plate center or axis in a symmetrical cross design in which the outer end of any zone provides the plate index point 49 for reference to the scale 48 provided by the carrier 42. When this form of stop opening is used, the projection of an image of the object 57 of FIGURE 3 through the stop and the screen of FIGURE 4, while the pairs of oppositely extending stop opening portions 61 are disposed in parallel relation to the different sets of screen lines, is operative to produce the half-tone negative line-and-dot design 57' of FIGURE 6 for an appropriate subsequent use thereof in providing a printing plate.

FIGURES 8 and 11 and 12 and 15 and 18 relate to the use of a diaphragm opening 63 of a stop plate 64 for producing differently oriented positive photographic designs from a negative on a film to be dot-etched for use in providing a printing plate in accordance with the subject provided. In practice, the specific form of the diaphragm opening 63 of this form of stop has been found to provide the best positives and has four outer points equally spaced from the stop axis and connected by like bounding arcs curved inwardly from their chords and has its index point 49 provided at the outer end of one of the radial lines which bisect opposite chords of the bounding arcs of the opening and comprise axes of symmetry of the aperture as well as do the lines joining opposite points of the aperture. It will be understood that a photographic film or plate made without the use of a stop plate or screen may thereafter be used with the stop 64 to photographically provide a positive line-and-dot design 58' on a process-sensitized film 24 for use in producing a printing plate.

Understanding that light-exposed areas of the "process" or "contrast" emulsion coating of a photographic plate or film 24 in which a positive or negative are being photographically provided through a stop and screen are known as peripherical dots, it has been found that such dots have a preferred pyramidal form when produced through the diaphragm openings of either of the stop plates 62 or 64 and are therefore particularly adapted for treatment by the spot application of a suitable opaque etchant comprising a filler material to reduce their base sizes while maintaining their density, as is necessary for obtaining true-tone printed reproductions of single-color or multi-color original subjects. It is also to be noted that corrected positives or negatives provided by the use of the present camera apparatus are particularly adapted for the provision of individual printing plates in which the ink-receiving recesses or wells are of like depth and may be of different area for providing variable color-tone effects, magnified portions of printing plates 71 and 72 and 73 being illustrated in FIGURES 14 and 17 and 20, respectively.

In using the present apparatus to produce positives or negatives for use in providing multi-color printing plates, a first negative or positive is usually provided for each of the colors to be individually and successively printed on the same receiving surface and usually requires the use of a translucent color filter in making the same. The present camera assembly may be used for such a purpose by omitting the half-tone screen 27, and substituting for a stop member in the carrier 42 an appropriate color-filter disc (not shown) which fits the socket 42. The negative or positive may then be photographed through a stop 64 or 62 and a half-tone screen 27, and the resulting positive or negative, following any size correction of its dots due to its peripherical nature, is then usable in producing a color-printing plate in the customary manner.

Figure 15:
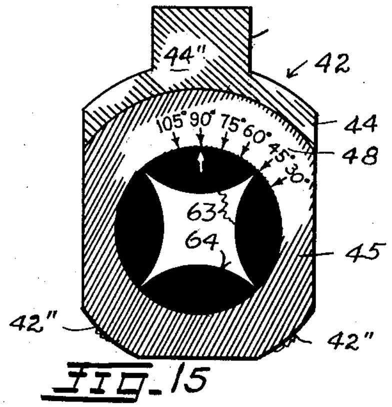
FIGURE 15 is an enlarged face view of the carrier and stop of FIGURE 8 and drawn at the scale of FIGURE 13.
Figure 18:
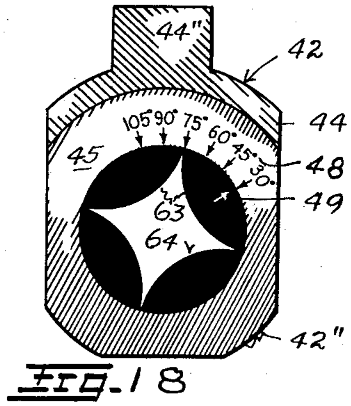
FIGURE 18 is a view similar to FIGURE 15 and shows the stop as adjustably turned through a 60-degree angle in the carrier.
Figure 16:
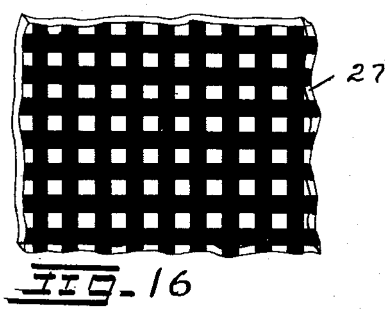
FIGURE 16 is an enlarged fragmentary view of the screen as positioned when the stop is disposed as in FIGURE 15.

By reference to FIGURES 15 and 18, it will be noted that a stop plate 64 is shown as disposed in different rotatively adjusted positions in the carrier 42, the index point 49 on the stop plate being registered with the 90° calibration of the angle scale 48 in FIGURE 15, while said index point registers with the 30° calibration of said scale in FIGURE 18. FIGURE 16 illustrates the relation of the rectangular pattern of the half-tone screen 27 to the positioned stop plate of FIGURE 15, it being noted that the radial line of the index point is parallel to one set of the screen lines. The screen position indicated in FIGURE 19 corresponds to the rotatively adjusted stop position in FIGURE 18, the rotative adjustment of the stop member having been manually effected in the manner indicated in FIGURE 12.

Figure 14:
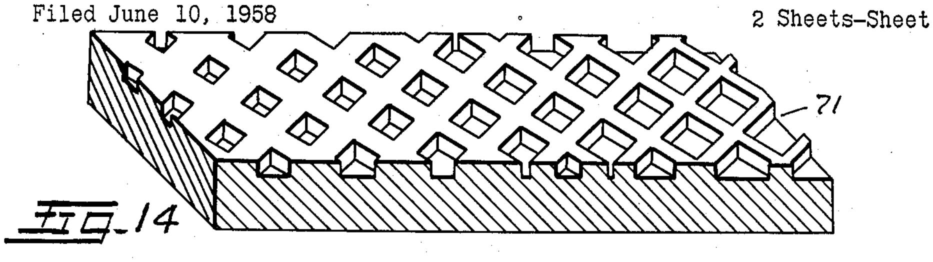
FIGURE 14 is a magnified perspective view of a portion of a half-tone plate as producible by the use of the present device.
Figure 19:
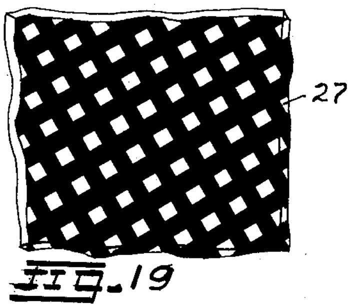
FIGURE 19 shows the screen in corresponding position with respect to the setting of the stop in FIGURE 18.
Figure 17:
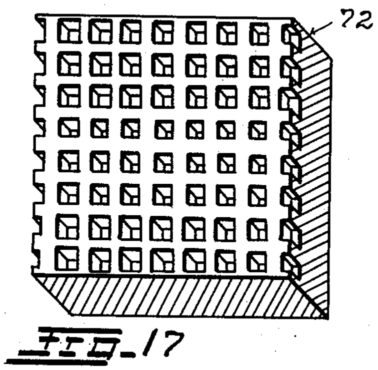
FIGURE 17 is a fragmentary enlarged perspective view of a half-tone photogravure plate which has been produced by using the stop and screen while they are set as in FIGURES 15 and 16 with respect to the carrier.
Figure 20:
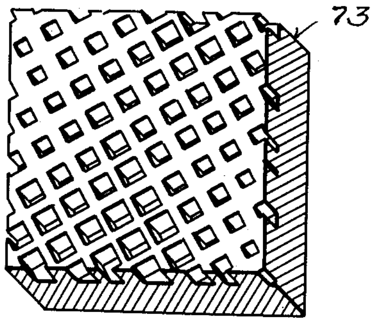
FIGURE 20 is a fragmentary enlarged perspective view of a half-tone photogravure plate which has been produced by cooperatively using the stop and screen settings of FIGURES 18 and 19.

The enlarged fragmentary showings of printing plates in FIGURES 17 and 20 indicate both the arrangement of the dots and the variable areas of the wells of like depth obtained from positives made when the stop member adjustments of FIGURES 15 and 18 are used, it being noted that the provision in the cooperatively usable printing plates 72 and 73 of the differently directed lines of ink-receiving cells prevents the occurrence of screen patterns in a final print produced by the joint use of the different plates 72 and 73 carrying different colors. Also, since most color printing is effected by printing from different plates inked with pigments having the colors red and yellow and blue and black, it is noted that FIGURES 14 and 19 and 20 illustrate the variable areas of the cells produced by the present means as is needed to faithfully reproduce the tonal qualities of the different colors for reproducing an original subject.

Understanding that an important feature of the method of the present invention comprises the disposal of an axis of symmetry of a cruciform stop opening in the same angular relation to the lines of a rotatively adjusted half-tone screen to provide different positives or negatives for use in preparing a plurality of plates for cooperative use in color, or other multiplate printing, it will be understood that different stop members having the apertures of the presumed identical size and conformation arranged for their non-rotative and coaxial mounting in a lens tube 34 might provide cruciform like apertures in mutually different angular relations, whereby they may be used with a camera screen 27 which has been set in corresponding positions. While this multi-stop arrangement comes under the scope of the present disclosure and might dispense with the use of a carrier 42, the production of transparencies therewith is generally less dependable than the present arrangement which provides for the use of the same stop element for providing all of the different transparencies of a cooperative set thereof.

From the foregoing description taken in connection with the accompanying drawings, the advantages of the present photogravure device will be readily understood by those skilled in the art to which the invention appertains. While I have shown and described a structure and operative arrangements which I now consider to be a preferred embodiment of my invention, I desire to have it understood that the showings are primarily illustrative, and that such changes and developments may be made, when desired, as fall within the scope of the following claims.

I claim:

1. In a camera for providing a set of photographic transparencies of a multi-colored subject for direct cooperative use in the production of a corresponding set of photogravure printing plates, a casing, a sight tube mounted at the forward casing end centrally thereof and having its axis of projection directed longitudinally of the casing and provided with a peripheral slot across its upper side, a support wall at the opposite end of the casing from said sight tube providing a means for mounting thereon a photographically sensitized image-receiving transparency carrying a contrast emulsion for receiving an image projected from the sight tube, a half-tone screen, a frame mounting said screen in said casing forwardly of said support wall for its rotative adjustment about said axis, a scale-and-pointer means of the screen and casing cooperative to indicate a rotatively adjusted position of the screen with respect to the frame, a stop carrier removably engaged through said tube slot in non-rotatable supported relation to the tube, a stop member comprising a circular disc providing a symmetrical diaphragm opening axially therethrough, means removably mounting said stop member on said carrier for its rotative adjustment about said axis, and a scale-and-pointer means cooperative between the stop member and the carrier for reference use in rotatively adjusting the stop member in accordance with the rotatably adjusted position of the screen in the frame.

2. In a camera for providing a set of photographic transparencies of a multi-colored subject for cooperative use in the production of a corresponding set of photogravure printing plates, a casing providing a support for a photographically sensitized image-receiving element disposed in fixed spaced relation to the subject for the projection of an image of the subject through a sight tube provided with a peripheral side slot and against a said element on the support, a half-tone screen disposed in front of said support for the projection of an image therethrough against a said element mounted on said support, a frame carrying said screen in the casing for a rotative adjustment of the screen about the camera axis, a planar stop member providing a symmetrical diaphragm aperture for cooperative use with said screen, and a carrier member non-rotatively and removably engaged in said tube slot and providing an opening complementarily and removably mounting the stop member therein for a rotative adjustment of the stop about said camera axis in such cooperative relation to the adjustably set screen that perpendicularly related lines of symmetry of the aperture are parallel to the lines of the different sets of lines of the positioned screen.

3. In a camera for providing a set of photographic transparencies of a multi-colored subject for direct cooperative use in the production of a corresponding set of photogravure printing plates, a camera casing, a sight tube mounted at the forward casing end and having its axis of projection directed longitudinally of the casing and provided with a peripheral side slot, a support wall at the opposite end of the casing from said sight tube transverse to the axis of projection of the tube and providing a means for mounting thereon an image-receiving transparency carrying a contrast emulsion for photographically receiving an image projected from the sight tube, a half-tone screen, a means mounting said screen in said casing between said support wall and the sight tube for mutually independent rotative and translatory adjustments of the screen about and along said axis respectively, a scale-and-pointer means of the screen and casing cooperative to indicate a rotatively adjusted position of the screen with respect to the casing, a stop member comprising a circular disc providing a symmetrical axial light opening, a carrier member removably engaged in said tube slot and removably mounting said stop member for its rotative adjustment about said axis, and a scale-and-pointer means cooperative between the stop member and the carrier member for reference use in rotatively adjusting the stop member in accordance with the rotatably adjusted position of the screen in the casing.

4. In multicolor photogravure, the combination with a half-tone screen mounted for its rotative adjustment in its plane about an axis transverse thereto and a photogravure sight tube having its axis of projection directed in said axis of adjustment of the screen and provided with a peripheral side slot, a stop carrier removably engaged through said tube slot in non-rotatable mounted relation to the tube and providing an interior circular opening therethrough coaxial with said axis, a stop member comprising a circular disc complementarily engaged in said carrier opening for its rotative adjustment therein and providing a symmetrical diaphragm opening axially therethrough and complementarily related to the design of said screen, and a scale-and-pointer means directly cooperative between the stop member and the carrier member for reference use in rotatively adjusting the stop member in accordance with the rotatively adjusted position of the screen.

References Cited in the file of this patent

UNITED STATES PATENTS

| | | |
|---|---|---|
| 1,060,982 | Huebner | May 6, 1913 |
| 2,596,115 | Austin | May 13, 1952 |
| 2,703,281 | Consaul et al. | Mar. 1, 1955 |
| 2,920,547 | Consaul et al. | Jan. 12, 1960 |

FOREIGN PATENTS

| | | |
|---|---|---|
| 631,118 | Great Britain | Oct. 27, 1949 |

OTHER REFERENCES

Mertle: The American Photo-Engraver, vol. 21, No. 10, September 1929, pp. 937–951.

Loening: Penrose Annual, 1950, pp. 122–126.